O. Zwietusch.
Pump.
N° 96,760.    Patented Nov. 9, 1869.
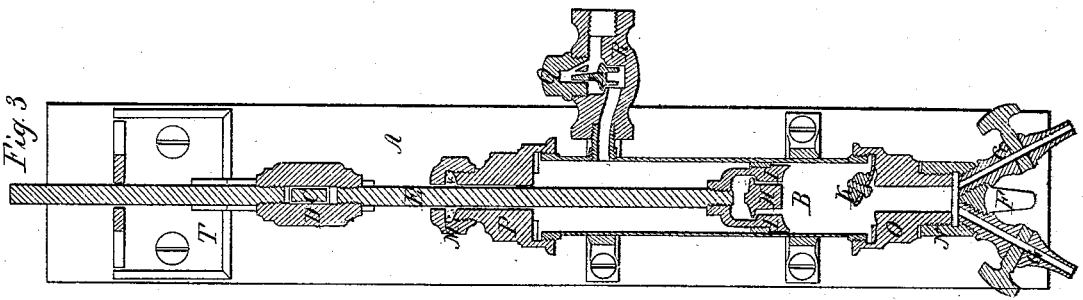
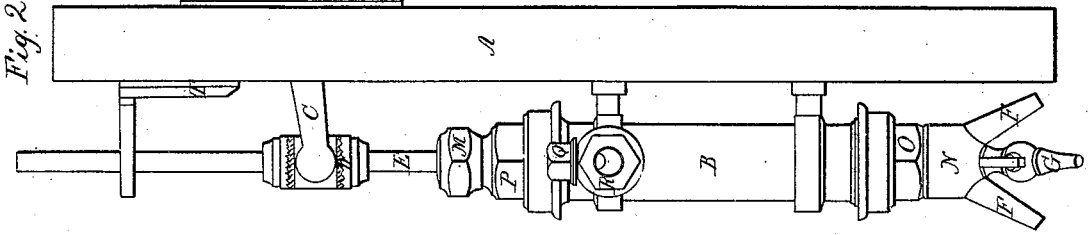
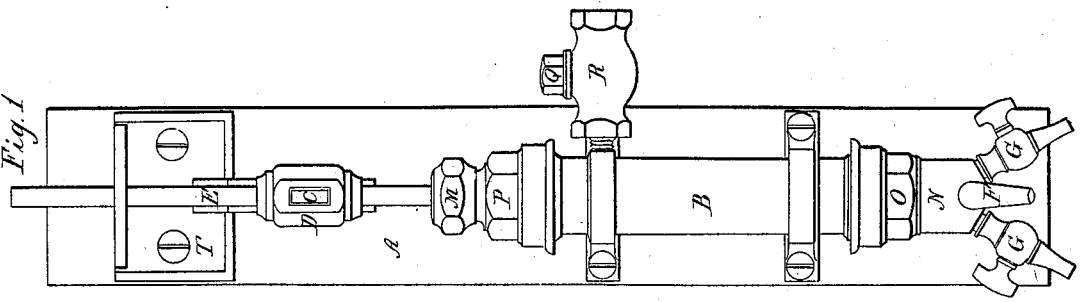
Witnesses
Inventor
Otto Zwietusch

UNITED STATES PATENT OFFICE.

OTTO ZWIETUSCH, OF MILWAUKEE, WISCONSIN.

IMPROVEMENT IN PUMPS.

Specification forming part of Letters Patent No. 96,760, dated November 9, 1869.

*To all whom it may concern:*

Be it known that I, O. ZWIETUSCH, of the city and county of Milwaukee and State of Wisconsin, have invented a new and useful Improvement in Pumps; and I do hereby declare that the following is a full, clear, and exact description thereof, which will enable those skilled in the art to make and use the same, reference being had to the accompanying drawings, forming part of this specification, in which—

Figure 1 is a perspective view; Fig. 2, a side view with the enlargement of the piston-rod broken out; Fig. 3, a sectional view.

Similar letters of reference in each of the figures indicate corresponding parts.

The object of my invention is to produce a pump for soda-fountains, and for other purposes handy and convenient for use.

A is the standard, to which the pump is secured; B, the pump-cylinder; C, the brake; D, an enlargement of the piston-rod through or into which the brake works and is not pivoted; E, the piston-rod; F F, a couple of inlet-pipes to which may be attached pipes leading to vessels containing articles necessary for making soda; G G, a couple of pipes with faucets to be used or not as circumstances may require; H, valve in the piston; I I, piston; K, valve; L, valve in the outlet of the pump; M, cover of the stuffing-box; N, connection that connects the pipes F F and G G to the bottom of the pump; O, valve-seat in the bottom of the pump; P, top of the cylinder and under part of stuffing-box; Q, plug in the outlet of the pump; R, outlet to the pump; S, fulcrum for the brake C; T, upper support for the piston-rod E.

Operation: Connect outlet-pipe R with the vessel to be filled, and connect as many of the pipes F F and G G to vessels containing whatever may be necessary to fill the vessel with and work the brake C. The end of brake C that enters the enlargement D on the rod E is made like a mortise or slot through it, and the end of the brake C works in and out and the rod E moves up and down perpendicular, making a very nice-working pump, and one in which a greater amount of throw can be used than in the ordinary pumps.

What I claim as my invention, and desire to secure by Letters Patent, is—

A pump when constructed with cylinder B, handle C, working without a pin in its end, enlargement D, piston-rod E, inlet-pipes F F, and pipes and faucets G G, valve H, piston I, valve K, valve L, cover M, connection N, valve-seat O, top P, plug Q, fulcrum S, support T, and frame A, all arranged substantially as described.

OTTO ZWIETUSCH.

Witnesses:
  W. N. HORNOR,
  J. B. SMITH.